(No Model.) 2 Sheets—Sheet 2.
J. O. MARKS.
GRAIN DRILL.
No. 332,919. Patented Dec. 22, 1885.
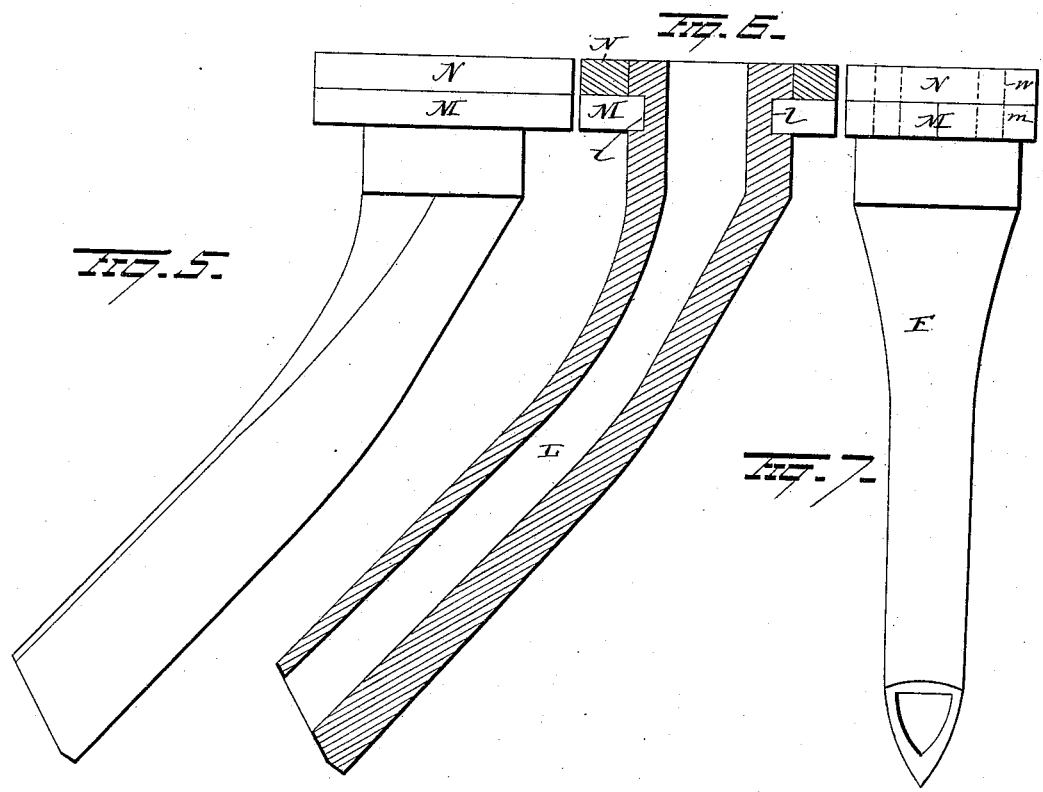
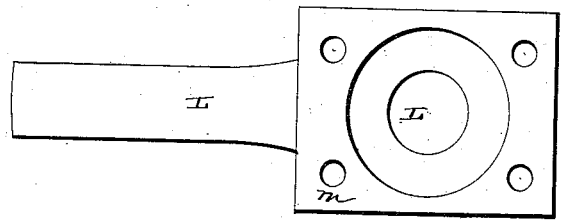

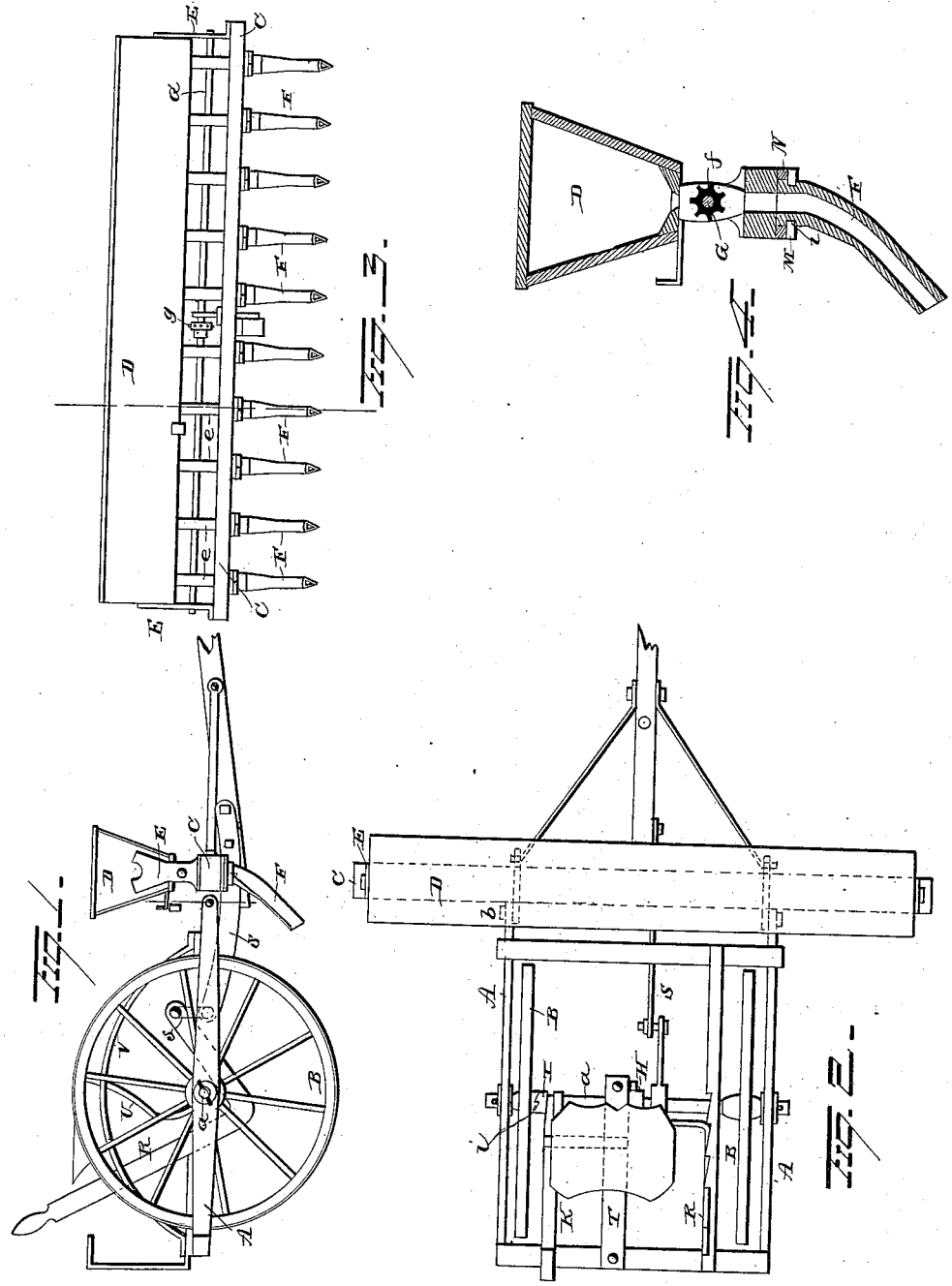

UNITED STATES PATENT OFFICE.

JACOB O. MARKS, OF URBANA, ILLINOIS.

GRAIN-DRILL.

SPECIFICATION forming part of Letters Patent No. 332,919, dated December 22, 1885.

Application filed September 3, 1885. Serial No. 176,083. (No model.)

*To all whom it may concern:*

Be it known that I, JACOB O. MARKS, of Urbana, in the county of Champaign and State of Illinois, have invented certain new and useful Improvements in Grain-Drills; and I do hereby declare the following to be a full, clear, and exact description of the invention, such as will enable others skilled in the art to which it appertains to make and use the same.

My invention relates to an improvement in grain-drills.

Hitherto the drills in common use have been provided with a plow or shovel point for removing the earth from a trench partially opened by a cutter, or for both cutting and removing the earth from the trench, and the dropping-throat has terminated a greater or lesser distance above the lowest point of the drill. The result has been that the trench has been partially filled at irregular intervals by the crumbling in of loose earth, small stones, &c., whereby the seed has been covered at unequal depths, and the growth and maturing of the crop been thereby injured. The broad-nosed or oval-shaped drill-hoe, so commonly employed, has further been found objectionable, on account of its liability to clog in cases where fine roots or coarse manure has been mixed with the soil, necessitating the stoppage of the team to clear it.

The object of my present invention is to provide a drill which will deposit the seed at a uniform depth, which will clear itself in foul soil, will swerve slightly to the right or left to escape stones, and yet automatically adjust itself to the line of draft, and which will afford a light draft and be durable and inexpensive.

With these ends in view my invention consists in certain features of construction and combinations of parts, as will be hereinafter described, and pointed out in the claims.

In the accompanying drawings, Figure 1 is a view of the machine in side elevation, some of the parts being removed. Fig. 2 is a top plan view. Fig. 3 is a rear view. Fig. 4 is a vertical section, taken transversely through the feed-hopper and through the center of one of the drill-sections. Figs. 5, 6, 7, and 8 represent enlarged views of one of the drills in side elevation, section, rear elevation, and top plan, respectively.

A represents the main frame of the machine, which is conveniently of rectangular form, and consists of two side bars having two cross-bars bolted thereto. It is mounted on the axle $a$, supported by the wheels B, loosely mounted thereon. To the front end of the frame A the sill C of the seed-sower is hinged, as shown at $b$. The seed-hopper D is secured a short distance above the sill C by means of the end standards, E, and the feed-spouts $e$ and the drills F are swiveled to the under side of the said sill. An adjustable partition (not shown) is to be located in each of the spouts in sowing all grains, except barley and oats.

Within each of the feed-spouts $e$ is located a feed regulating or dropping wheel, $f$, each of the said feed regulating or dropping wheels being secured on a horizontal shaft, G, extending transversely through the several feed-spouts. The shaft G is provided with a sprocket-wheel, $g$, rigidly secured thereon and connected with a corresponding sprocket-wheel, H, secured on the main axle $a$ by a suitable belt or chain. The shaft $a$ is caused to rotate with the wheels B, at the pleasure of the operator, by means of a clutch-section, I, having a sliding motion longitudinally on the shaft, but caused to rotate therewith by means of feather and groove or equivalent device, which clutch-section is adapted to engage a clutch-section, $i$, rigidly secured on the end of the hub of one of the wheels B. A shifting-lever, K, is located within convenient reach of the driver to operate the clutch. The rotation of the axle $a$ causes the shaft G, and hence the feed-regulating wheels $f$, to rotate and convey the seed from the hopper to the dropping-throats in such amounts as are desired.

F represents one of the drill-bars. It consists of a hollow metal bar, triangular-shaped in cross-section, swiveled to the sill at its upper end and bent rearwardly in such a manner as to trail with the sharp edge toward the front. The cross-section of the blade portion is preferably an isosceles triangle, each of the two equal sides being considerably longer than the base, and the angle formed by the two equal sides being therefore quite small. This thin edge of the bar is the front edge, and is ground down to a sharp cutting-edge, which acts as a colter in cleaving the soil, small roots, and straw. The hole within the bar forms the dropping-throat and communicates directly with the lower end of the feed-spout e. The upper end of the bar or drill-hoe F is cylindrical and provided with an annular groove, l. A collar consisting of two half-sections, M, is adapted to loosely embrace the drill-hoe L within the groove l, and a second collar, N, similar to the collar M, with the exception that it is formed in one piece, is adapted to loosely embrace the upper end of the drill-hoe and rest in contact with the upper side of the collar M and flush with the top of the drill-hoe. Perforations m are formed in the sectional collar M, which register with corresponding perforations, n, in the collar N, and these in turn register with perforations which extend through the sill. It will be readily seen that when the collars M and N are placed in position on the drill-hoe and the bolts placed in the perforations and extended through the beam, the sections of the collar M will be thereby locked in position about the drill-hoe, the collar N will be locked on the upper end of the drill-hoe, and the drill-hoe will be locked to the sill in a free swinging adjustment. As the machine is drawn forwardly, the drill hoes automatically assume their trailing positions and hold the same, subject only to such slight shearing movements as are advantageous in dodging stones or other obstructions, and, since the dropping-throat terminates at the very extremity of the drill-hoe, the seed will fall into the bottom of the trench before any loose earth or trash can fall there, and the seed will therefore be sown at a uniform depth. The sill C, with the drill-hoes attached thereto, is elevated and depressed by means of an elbow-lever, R, which is pivotally secured to the axle a. The rear or handle-arm of the lever extends upwardly within convenient reach of the driver, and the forward arm is connected by means of a link, s, with the end of a rearwardly-extending arm, S, secured to the sill. A sector-bar, V, secured to the main frame, as shown, is adapted to engage the handle of the lever R, or a dog secured to the handle, and lock the lever in the desired adjustment. A short bar, T, one end of which is secured to the rear cross-bar and the other end to the axle, forms a support for the spring-standard U, which supports the driver's seat. When the drills are lowered, the sill C, the drill-hoes themselves, the hopper, and the grain in the hopper exert their combined weight in pressing the drill-hoes into the soil. This weight is supposed to be sufficient to press the drills into the hardest ground, and when used on softer soil the depth of cut may be regulated by the lever R. The sharp edge of the drills separates the roots and straws with an effective draw-cut due to the slant which it assumes in moving forwardly.

The machine as a whole is free from the complicated parts, which are apt to work better in theory than in practice, and at the same time is capable of performing the very best quality of work.

It is evident that slight changes might be resorted to in the construction and arrangement of the several parts described without departing from the spirit and scope of my invention; hence I do not wish to limit myself strictly to the construction herein set forth: but, Having fully described my invention, what I claim as new, and desire to secure by Letters Patent, is—

1. In a grain-drill, the combination, with a hopper and a sill, of a drill-hoe swiveled, substantially as described, to the sill, below the hopper, and provided with a dropping-throat extending throughout the entire length of the hoe, substantially as set forth.

2. In a grain-drill, a drill-hoe adapted to be swiveled to the sill below the hopper, and having a dropping-throat formed therein, substantially as set forth.

3. The combination, with the sill located below the hopper, of a series of drill-hoes swiveled, substantially as described, to the sill, and having dropping-throats formed therein, said drill-hoes being bent obliquely to the sill and thereby caused to trail in substantially straight lines as the sill is moved forwardly, substantially as set forth.

4. In a grain-drill, a drill-hoe swiveled to a sill, substantially as described, and provided with a sharp cutting-edge, and having a dropping-throat formed therein, substantially as set forth.

5. In a grain-drill, the combination, with the dropper-sill, of a drill-hoe having a rotary movement on said sill and bent to form an oblique angle therewith, said drill-hoe having a sharp cutting-edge and a dropping-throat located within, substantially as set forth.

6. In a grain-drill, the combination, with a series of drill-hoes swiveled to the sill of the dropper, and adapted to serve as dropping-throats, of a sulky to the frame of which the dropper-sill is hinged, and from which the drill-hoes are elevated or depressed, substantially as set forth.

7. In a grain-drill, the combination, with the sulky, of the dropper-sill hinged thereto, a series of drill-hoes swiveled to the dropper-sill, and an elbow-lever pivotally secured to the axle of the sulky and to the sill, whereby the series of drill-hoes are elevated and depressed, substantially as set forth.

8. In a grain-drill, the combination, with the dropper-sill, and a drill-hoe having an annular groove near its upper end, of a sectional collar adapted to embrace the drill-hoe in the groove, a collar adapted to embrace the drill-hoe above the groove, and a series of draw-bolts adapted to lock the collars in position and the drill-hoe to the sill, substantially as set forth.

In testimony whereof I have signed this specification in the presence of two subscribing witnesses.

JACOB O. MARKS.

Witnesses:
I. E. MORRISON,
B. A. DUNLAP.